United States Patent
Arnold

(10) Patent No.: US 6,234,460 B1
(45) Date of Patent: May 22, 2001

(54) PUSH-ON AIR SPRING BUMPER

(75) Inventor: John Eric Arnold, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/378,828

(22) Filed: Aug. 23, 1999

(51) Int. Cl.⁷ .................. F16F 9/50; F16F 9/04; F16M 1/00
(52) U.S. Cl. .......... 267/35; 267/64.27; 267/140; 267/122
(58) Field of Search .............. 267/64.27, 122, 267/140, 124, 127, 219, 220, 35, 152, 153, 116, 292–294, 141–141.6, 33, 142–145, 64.24, 64.23, 64.19, 64.21; 280/124.177, 124.155, 124.162, 124.116; 114/219; 293/120; 16/86 A; 296/207; 248/634, 631

(56) References Cited

U.S. PATENT DOCUMENTS

| | | | |
|---|---|---|---|
| 4,398,704 | 8/1983 | Buchanan, Jr. et al. | 267/64.21 |
| 4,506,910 | 3/1985 | Bierens | 280/711 |
| 4,787,606 | 11/1988 | Geno et al. | 267/64.27 |
| 4,828,232 | 5/1989 | Harrod et al. | 267/64.24 |
| 4,934,667 | 6/1990 | Pees et al. | 267/64.21 |
| 5,201,500 | 4/1993 | Ecktman et al. | 267/140 |
| 5,535,994 | 7/1996 | Safreed, Jr. | 267/64.27 |
| 5,934,652 * | 8/1999 | Hofacre et al. | 267/64.27 |
| 6,070,861 * | 6/2000 | Ecktman | 267/64.27 |
| 6,113,081 * | 9/2000 | Hilburger et al. | 267/64.27 |

* cited by examiner

Primary Examiner—Douglas C. Butler
(74) Attorney, Agent, or Firm—Nancy T Krawczyk

(57) ABSTRACT

The disclosed invention is directed toward an improved airspring bumper (20) and an airspring (10) comprising the improved bumper (20). The bumper (20) is defined by a dual reinforcing structure comprising concentric sets of ribs (50, 58) for absorbing and distributing loads generated from contact between the bumper (20) and an opposing retainer (16). The bumper (20) is secured to one of the airspring retainers (18) by a compression fit between the retainer (18) and the bumper (20) or by a central barbed post (36).

10 Claims, 3 Drawing Sheets

PUSH-ON AIR SPRING BUMPER

FIELD OF THE INVENTION

The disclosed invention relates to air springs. In particular, the invention is directed towards an improved internal bumper for an air spring and a method of mounting the improved bumper.

BACKGROUND OF THE INVENTION

Air springs have been used for motor vehicles and various machines and other equipment for a number of years. Air springs provide cushioning between movable parts, primarily to absorb shock loads imparted thereon. The air spring usually consists of a flexible elastomeric reinforced sleeve that extends between a pair of end members. The sleeve is attached to the end members to form a pressured chamber therein. Depending on the specific air spring construction, there may be one or more pistons located within the flexible sleeve. The air spring is mounted on spaced components or parts of the vehicle or equipment.

The internal pressurized fluid, generally air, absorbs most of the shock impressed upon or experienced by one of the spaced end members by which the air spring is mounted. The end members move inwards and towards each other and also away and outwards from each other upon absorbing the imparted shock.

To prevent the end members from contacting each other during inward movement, many air springs have internal bumpers mounted on one of the end members. The bumper extends axially into the interior of the pressurized chamber. The bumper absorbs shock when the air spring experiences severe shocks and deflections and prevents a total collapse or deflection of the air spring in the event of an air spring failure.

Known internal bumpers include the solid elastomeric bumpers disclosed in U.S. Pat. Nos. 4,506,910 and 4,787,606. The bumpers are mounted on either end member of the air spring. The bumpers are attached to the end member by means of a post having an enlarged end over which the solid rubber bumper is mounted. When the bumper is made from solid rubber, hydraulic loading of the rubber occurs when the bumper is subjected to repetitive high forces, and this loading is transferred to the metal retainer.

U.S. Pat. No. 5,201,500 discloses a thermoplastic, non-solid bumper. The bumper is secured to a post by circumferentially arranged flexible fingers. While this bumper eliminates the issue of hydraulic loading of a solid rubber bumper, the disclosed bumper is subject to the fingers breaking off due to excessive or repetitive shock absorption. The disclosed bumper is also more complex and costly to manufacture because of the flexible fingers.

The present invention is directed toward an improved bumper for an air spring that overcomes the limitations of the above mentioned prior art bumpers.

SUMMARY OF THE INVENTION

The disclosed invention is directed toward an improved airspring bumper and an airspring comprising the improved bumper. The airspring is comprised of a flexible sleeve secured at opposing ends by retainers. The bumper is secured to one of the retainers so that the outer surface of the bumper can contact the opposing retainer. The inventive bumper is defined by a dual reinforcing structure comprising concentric sets of ribs for absorbing and distributing loads generated from contact between the bumper and an opposing retainer.

The inventive bumper may have the further aspect of each set of reinforcing ribs being defined by radially extending supporting ribs.

The inventive bumper may have the further aspect of the reinforcing ribs being defined by each set of ribs being enclosed by a reinforcing ring.

Another aspect of the inventive bumper includes the sets of reinforcing ribs of the bumper having different axial heights. Furthermore, when the ribs are defined by different heights, the radially innermost set of ribs may extend into a well formed in the central portion of the retainer on which the bumper is mounted.

In a further aspect of the airspring, the bumper is secured to the retainer by means of compression fit between the bumper and the retainer.

In anther aspect of the airspring, the bumper is secured to the retainer by means of a barbed post that is secured to the retainer.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
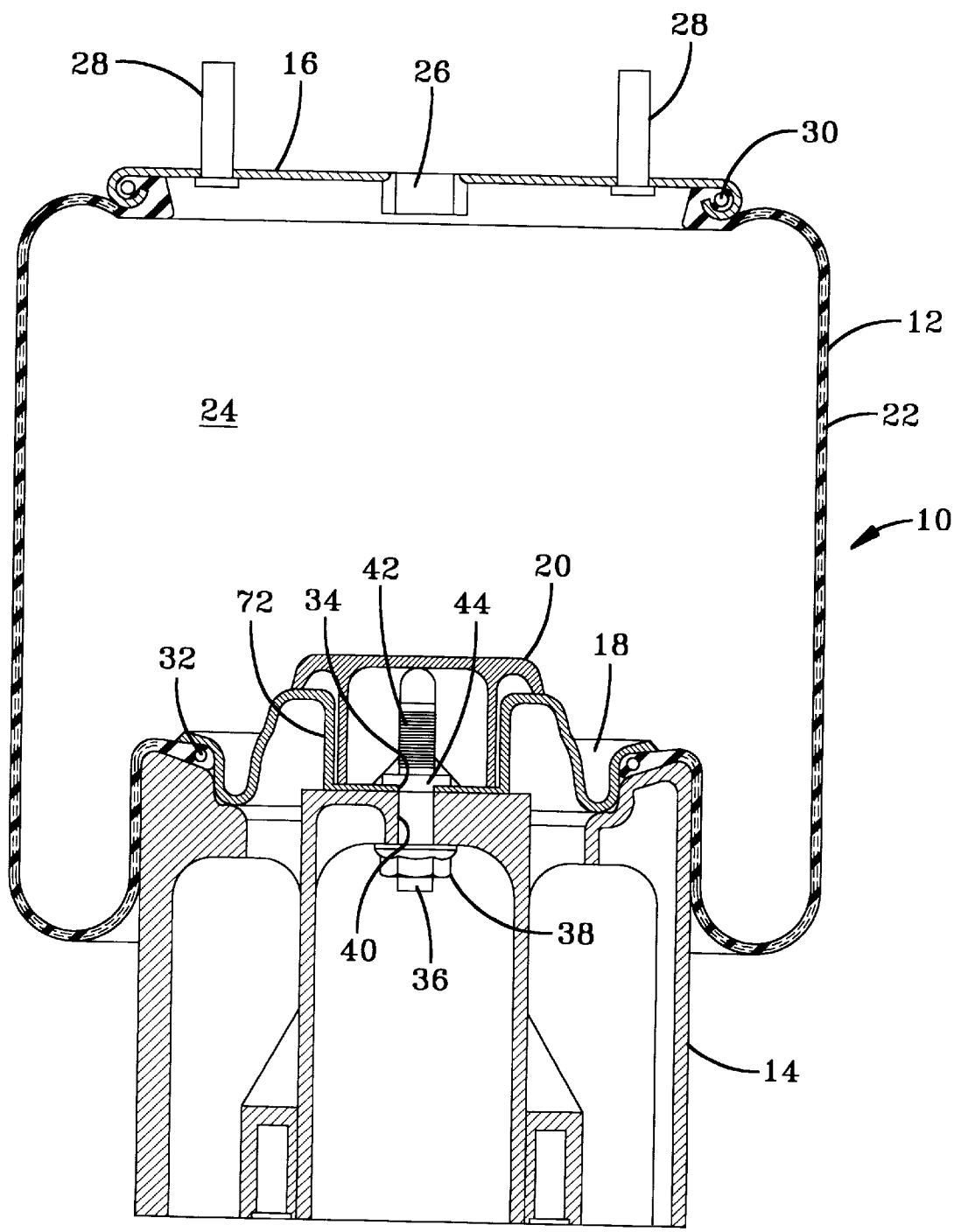
FIG. 1 illustrates a cross-sectional view of an airspring with the inventive bumper.

FIG. 1 illustrates an air spring 10. The air spring 10 is the type conventionally referred to as a "rolling lobe" airspring, comprising an airsleeve 12, piston 14, an upper retainer 16, a lower retainer 18, and a bumper 20. For reinforcement of the sleeve 12, at least one layer of reinforcement 22 may be provided within the sleeve 12. The reinforcement layer 22 is formed of conventional cords such as polyester, nylons aramid, glass, or steel; the chosen reinforcement material is determined by the forces to which the air spring will be subject upon use. The length and diameter of the sleeve 12, and thus the overall size of the air spring 10, varies depending upon the end use of the air spring 10.

The upper end of the sleeve 12 is secured to the upper retainer 16, while the lower retainer 18 and the piston 14 secure the lower end of the sleeve 12, forming a pressurized chamber 24. The upper retainer 16 has a combination stud 26 permitting the fluid to flow into the pressurized chamber 24. The preferred fluid introduced into the chamber 24 is air. The upper retainer 16 may also be provided with a mounting stud 28. The upper end of the sleeve 12 is illustrated as being attached to the upper retainer 16 by means of an interlocking construction between the upper retainer 16 and an internal bead 30 located at the upper end of the airsleeve 12. The sleeve 12 may also be attached to the upper retainer 16 by other known conventional methods, such as snapping the sleeve onto the retainer or the use of a bead retaining ring located outward of the sleeve as illustrated in U.S. Pat. No. 5,535,994.

As noted above, the lower end of the sleeve 12 is secured between the lower retainer 16 and the piston 14. The lower end of the sleeve has a bead 32 to assist in securing the sleeve 12. The beads 30, 32 of the air sleeve 12 may be steel cable wires, as well as other known conventional air spring bead construction materials.

The lower retainer 18 is a solid metal ring, with a central opening 34. The retainer 18 is secured to the piston 14 by means of an extending post 36 and a locking nut 38. The post 36 passes through a central opening 40 in the piston 14. The opposing end of the post 36, distant from the locking nut 38, has a series of concentric barbs 42. About halfway between the two ends of the post 36 is a formed plate washer 44. Prior to assembling the airspring, the post 36 is welded into the retainer 18 with the formed plate washer 44 flush against the retainer 18. The bumper 20 is then pushed onto the post 36 and secured by means of the compression fit between the bumper 20 and the post 36; the barbs assist in maintaining the bumper 20 on the post 36 by restraining movement of the bumper 20. Then, upon assembling the air spring, the post 36 is inserted into the central opening 40 of the piston 14 and the locking nut 38 is secured to the post 36 to secure the retainer 18 to the piston 14.

Figure 2:
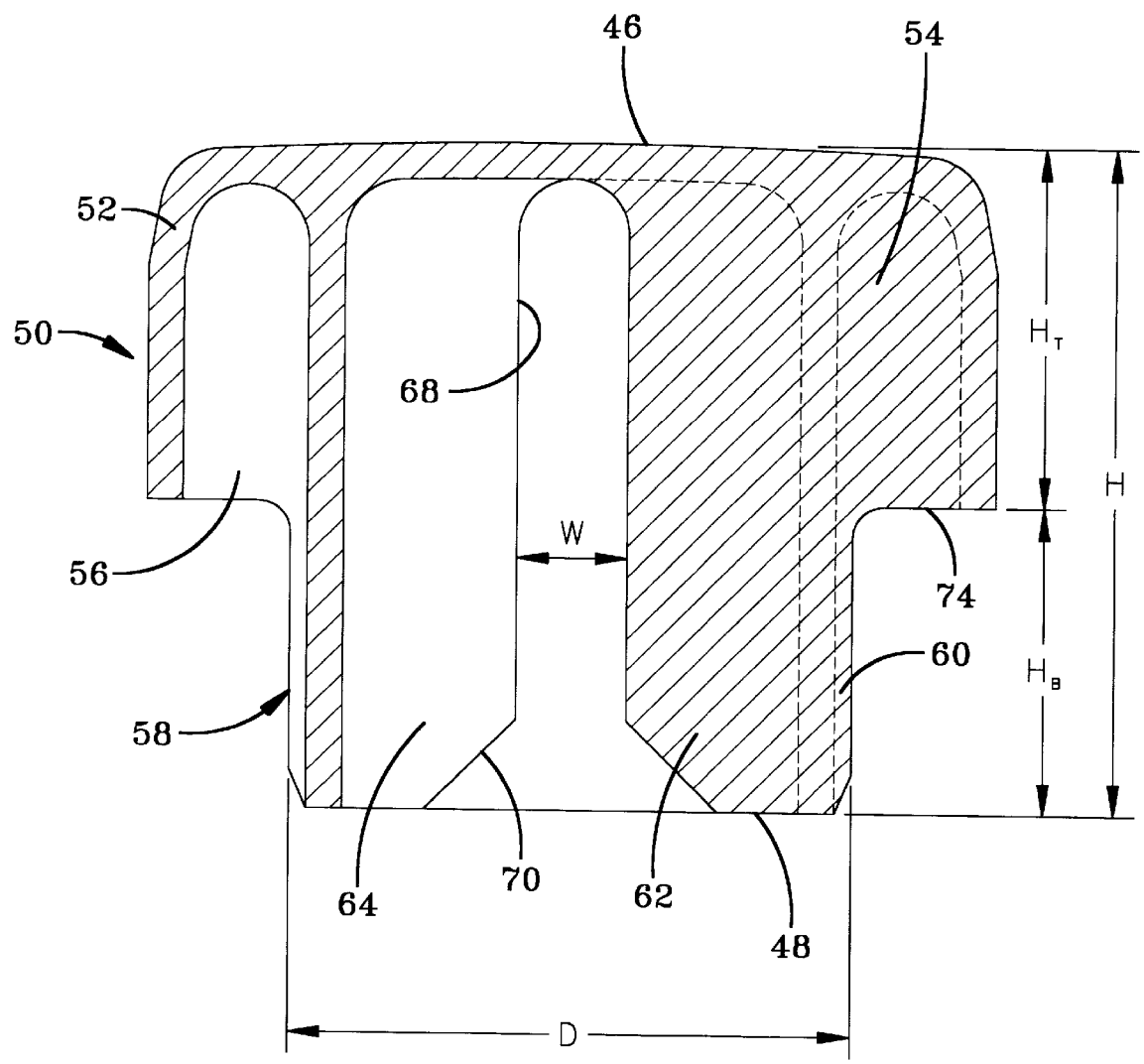
FIG. 2 illustrates a cross-sectional view of the inventive bumper.
Figure 3:
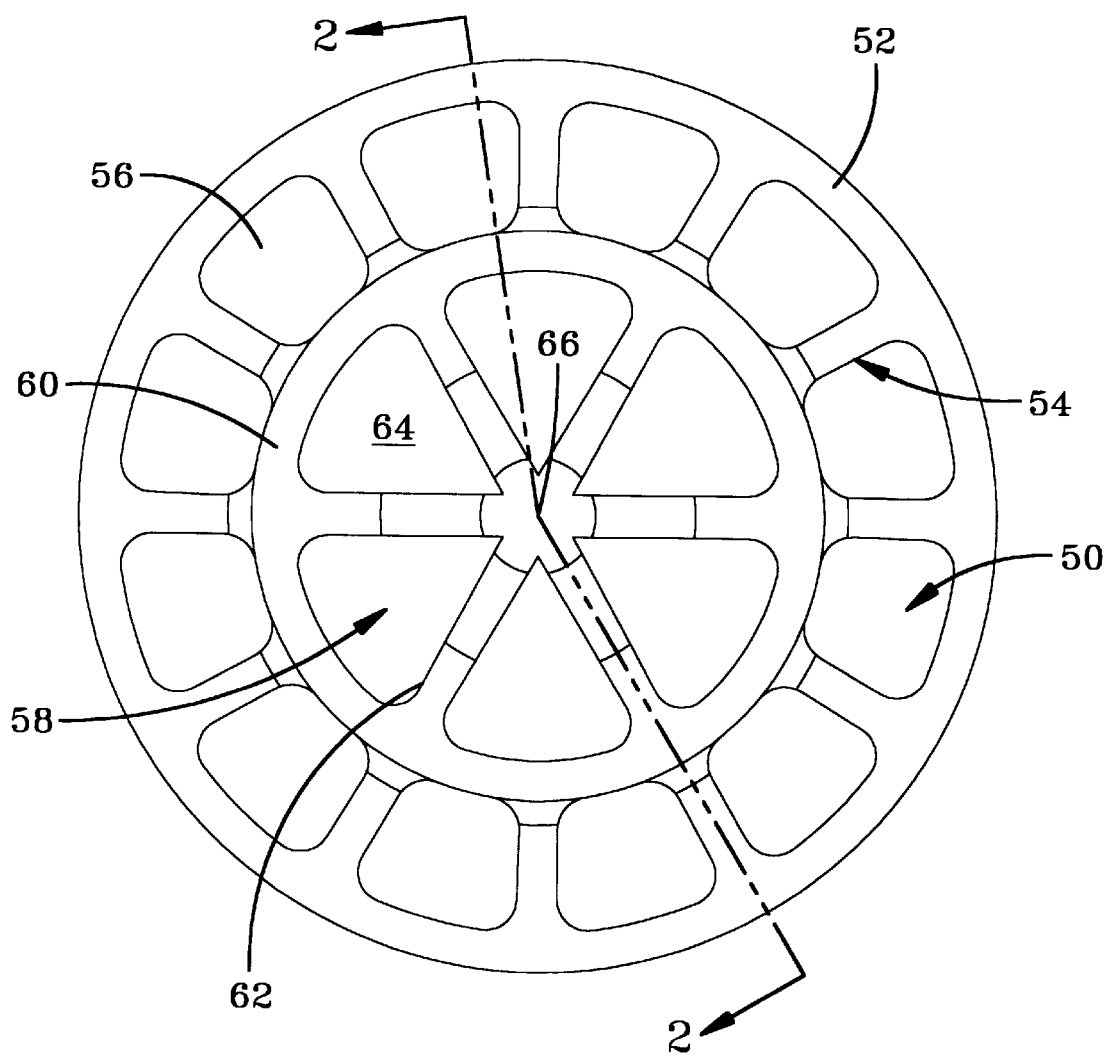
FIG. 3 illustrates another cross-sectional view of the inventive bumper

The bumper 20 is more clearly illustrated in FIGS. 2 and 3. The bumper 20 has a flat or slightly curved top surface 46 and a bottom surface 48 that rests against the lower retainer 18. The bumper 20 has an dual reinforcing structure comprising concentric sets of ribs and rings. The outer ring portion 50 of the bumper 20 has an outer ring wall 52 and a plurality of radially extending ribs 54, see FIG. 3. The ribs 54 are spaced about the circumference of the outer ring portion 50, defining spaces 56 between the ribs 54. The ribs 54 have a depth equal to the full depth of the outer ring portion 50.

The inner ring portion 58 has elements similar to the outer ring portion 50. An inner ring wall 60 defines the inner ring portion 58, and a plurality of radially extending ribs 62 define a plurality of spaces 64. The ribs 62 are spaced about the central point 66 of the bumper, the radially inner edge 68 of the ribs 62 being spaced from each other by width W. The radially innermost edges 70 of the bottom 68 of the ribs 62 are undercut to accommodate the formed plate washer 44.

The inner rib spacing width W is approximately equal to or just less than the maximum diameter of the barbs 42. If the width W is greater than the diameter of the barbs 42 than the desired compression fit between the bumper 20 and the post 36 is not obtained. If the width W is significantly less than the maximum diameter of the barbs 42 than extreme force is required to mount the bumper 20. Additionally, the outer diameter D of the inner ring portion 58 of the bumper 20 is approximately equal to the inside diameter of the central well 72 of the lower retainer 18, to assist in the compression fit of the bumper 20.

The overall height H of the bumper 20, as measured from the top surface 46 to the bottom edge 48, may vary depending upon the ultimate end use of the airspring 10 and the desired spring rate of the bumper 20. The height H is a component of the height $H_B$ and the height $H_T$. The height $H_T$ is height of the outer ring portion 50; the height $H_B$ is the height of the remaining, lower portion of the bumper 20. The height $H_B$ is dependent upon the depth of the central well 72 of the lower retainer 18, so that when the bottom 48 of the bumper 20 contacts the base of the well 72, the inner edge 74 of the outer ring portion 20 contacts the lower retainer 18. When it is desired to vary the height of the bumper 20, either the height $H_T$ can be increased or decreased, or the height $H_B$ and the depth of the central well 72 can be correspondingly varied; or both heights may be varied with the understanding that the variance of the height $H_T$ will have a greater impact on the spring rate of the bumper and the variance of the height $H_B$ will have a greater impact on the total weight of the airspring 10. For ease of manufacturing, when it is desired to vary the height H of the bumper, only the height $H_T$ is varied Varying only the height $H_T$ allows the bumper to still provide the needed structural support for the shocks to which the bumper is to be subjected as the length of the structural ribs 56, 62 also vary with the height $H_T$.

The bumper 20 is formed from a thermoplastic or thermoset material capable of withstanding repeated impact forces and capable of transmitting forces. The tensile strength of the material should be within the range of 28,000 to 45,000 psi, have a flex strength in the range of 40,000 to 60,000 psi, and notched izod strength of 2.0 to 12.0 ft-lb/in. Materials that meet these required characteristics include, but are not limited to, fiberglass reinforced nylon, long fiber reinforced thermoplastic, commercially available under trade name CELSTRAN, and short fiber reinforced thermoplastic, commercially available under trade name ZYTEL. The preferred material is polyurethane with a 60% load of long glass fiber, the fibers have a length of about 11 mm.

The present inventive bumper 20, in comparison to conventional solid rubber or solid plastic bumpers, distributes the load more evenly, thereby eliminating any hydraulic loading of the metal retainer 18. Thus the bumper 20 can be subjected to a large amount of impact force without damaging the retainer 18.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An improved airspring (10) comprising a flexible sleeve (12) secured at opposing ends, first and second retainers (16, 18), and a bumper (20), the sleeve (12) being secured at a first end to one of the retainers (16) and at the opposing end to the other retainer (18), and the bumper (20) being secured to one of the retainers (18), the improvement being characterized by:

the bumper (20) having a dual reinforcing structure comprising concentric sets of ribs (50, 58) for absorbing and distributing loads generated from contract between the bumper (20) and an opposing retainer (16) wherein each set of ribs (50, 58) is positioned concentric relative to the radial center of the bumper (20) and comprises radially extending ribs (54, 62).

2. An improved airspring (10) in accordance with claim 1, wherein each set of ribs (50, 58) comprises an outer reinforcing ring (52, 60).

3. An improved airspring (10) in accordance with claim 1, wherein the sets of ribs (50, 58) have different axial heights.

4. An improved airspring (10) in accordance with claim 3, wherein the radially outer set of ribs (50) have an axial height ($H_T$) less than the height (H) of the radially inner set of ribs (58), and the retainer (18) has a central well (72) and the radially inner set of ribs (58) extend into the retainer well (72).

5. An improved airspring (10) in accordance with claim 1, wherein the bumper (20) is secured to one of the retainers (18) by means of compression fit between the bumper (20) and the retainer (18).

6. An improved airspring (10) in accordance with claim 1, wherein the bumper (20) is secured to one of the retainers

(18) by means of a barbed post (36) that is secured to the one of the retainers (18).

7. An improved airspring (10) in accordance with claim 1, wherein the bumper (20) is formed from a thermoplastic or thermoset material.

8. An improved airspring (10) in accordance with claim 6, wherein the bumper (20) is formed from a material which has a tensile strength within the range of 28,000 to 45,000 psi, a flex strength in the range of 40,000 to 60,000 psi, and a notched izod strength of 2.0 to 12.0 ft-lb/in.

9. An improved airspring (10) in accordance with claim 1, wherein the bumper (20) is formed from a material selected from the group consisting of fiberglass reinforced nylon, long fiber reinforced thermoplastic, and short fiber reinforced thermoplastic.

10. An improved airspring (10) in accordance with claim 1, wherein each radially extending rib (54, 62) in each rib set (50, 58) has a depth equal to the full depth of the rib set (50, 58).

* * * * *